G. W. Lombard,
Saw Hanging.
No. 108,370.    Patented Oct. 18, 1870.
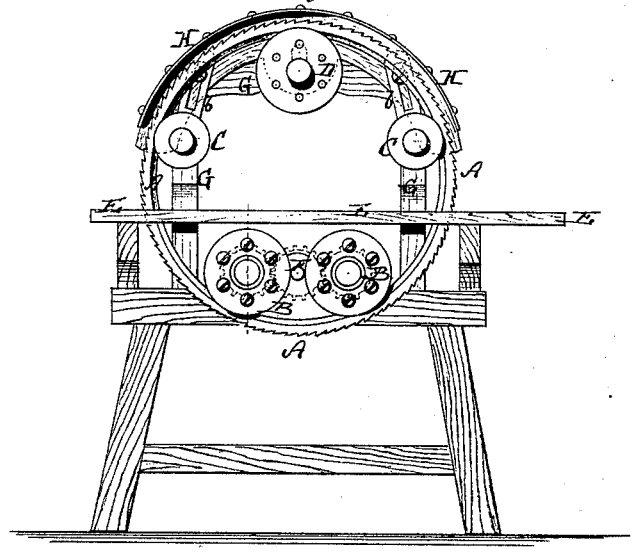
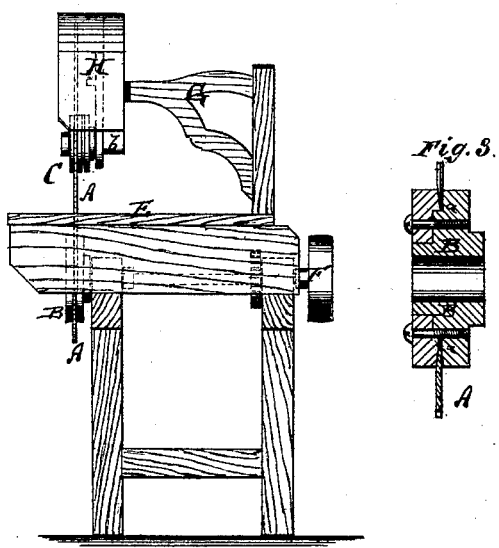

United States Patent Office.

GEORGE W. LOMBARD, OF WESTMINSTER, MASSACHUSETTS.

Letters Patent No. 108,370, dated October 18, 1870.

IMPROVEMENT IN SAWING-MACHINES.

The Schedule referred to in these Letters Patent and making part of the same.

*To all whom it may concern:*

Be it known that I, GEORGE W. LOMBARD, of Westminster, in the county of Worcester and State of Massachusetts, have invented a new and improved Sawing-Machine; and I do hereby declare that the following is a full, clear, and exact description thereof, which will enable others skilled in the art to make and use the same, reference being had to the accompanying drawing forming part of this specification, in which—

Figure 1 represents a front elevation of my improved sawing-machine.

Figure 2 is a side elevation of the same.

Figure 3 is a detail transverse section of the driving friction-pulley.

Similar letters of reference indicate corresponding parts.

This invention relates to a novel construction of saw-blade and machine for operating the same, and has for its object to produce a constantly-operating, strong, and reliable saw, for cutting fellies and other light work.

The invention consists chiefly in the use of an annular saw-blade, which receives motion by friction-rollers bearing against its inner edge.

The invention consists, also, in the arrangement of devices for operating the saw.

A in the drawing represents an annular endless saw-blade, made of suitable metal, with the teeth on its outer edge, as shown. It is supported on the frame A of the sawing-machine by means of rollers B C D, as shown.

The inner part of the blade fits into grooves of the said rollers, and the saw is thereby steadied laterally.

The driving-roller or rollers B, under the top of the table E, receive their motion, by gearing or otherwise, from the driving-shaft F, one or both. The sides of their grooves are beveled, as shown in fig. 3, to correspond with the beveled face or faces of the saw-blade.

The grooves are more or less filled by metal or other rings, *a*, which can be taken out and replaced by others of different size, to adapt the rollers thereby to saw-blades of different internal diameters. For this purpose each roller is made of two pieces, which can be taken apart to receive the ring. By the bevels the necessary friction for revolving the saw is produced.

The rollers C C are or may be hung to arms *b*, which are adjustably secured to a frame, G, that projects above the table to support a segmental protection, H, of the saw.

The roller D is hung directly to the frame G.

All or some of the rollers have several grooves of different widths, to fit saw-blades of different thicknesses.

Each of the rollers may contain a ring, *a*, in its groove, for the purpose of properly fitting and holding the saw.

I do not confine myself to the particular herein-described arrangement of frame and rollers; but

Having thus described my invention,

I do claim and desire to secure by Letters Patent—

The guide-rollers C D, combined with bevel-grooved driving-rolls B B, rotated in the manner described, to operate a circular saw.

GEORGE W. LOMBARD.

Witnesses:
 EDWIN F. PERSON,
 FRANKLIN LOMBARD.